US007210495B1

(12) United States Patent
Olson

(10) Patent No.: US 7,210,495 B1
(45) Date of Patent: May 1, 2007

(54) GAS LINE SAFETY VALVE SYSTEM

(76) Inventor: Vaughn F. Olson, 155 N. 600 East P.O. Box 415, Cleveland, UT (US) 84518

( * ) Notice: Subject to any disclaimer, the term of this patent is extended or adjusted under 35 U.S.C. 154(b) by 231 days.

(21) Appl. No.: 11/038,800

(22) Filed: Jan. 21, 2005

(51) Int. Cl.
*F17D 1/04* (2006.01)
*F17D 15/02* (2006.01)
*F16K 17/00* (2006.01)

(52) U.S. Cl. .................... 137/39; 137/357; 137/561 A; 137/561 R; 137/601.18; 251/129.04

(58) Field of Classification Search .................. 137/38, 137/39, 65, 66, 357, 561 A, 561 R, 601.18; 251/129.04
See application file for complete search history.

(56) References Cited

U.S. PATENT DOCUMENTS 4,643,213 A * 2/1987 Mirel .......................... 137/10
4,930,488 A 6/1990 Pearman et al.
5,126,934 A * 6/1992 MacFadyen ........... 251/129.04
5,143,110 A 9/1992 Simpson
5,240,022 A 8/1993 Franklin
5,636,653 A * 6/1997 Titus .......................... 137/14
5,838,243 A 11/1998 Gallo
6,025,788 A * 2/2000 Diduck .................. 340/870.16
6,470,903 B2 10/2002 Reyman
2002/0170595 A1 11/2002 Oliver

OTHER PUBLICATIONS

Title of Source: www.qtronics.com Product Name: Gas Maestro and RF Gas Maestro.

* cited by examiner

*Primary Examiner*—Stephen M. Hepperle

(57) ABSTRACT

A safety valve system includes a control valve connected to a gas meter and intersecting a gas flow path downstream of the gas meter and upstream of an entry point of a building. The control valve is adaptable between open and closed positions based upon received stimuli. A main gas supply line is mated to the control valve and includes auxiliary lines branching to appliances. A plurality of sensors are coupled in series to the appliances and are in communication with the control valve. A mechanism is included for transmitting a control signal to the control valve and for eliminating a fully charged gas line when the stimuli are detected by one of the sensors such that the control valve can allow and restrict gas flow to the appliances during operating and non-operating modes. Each of the sensors generates a unique control signal when the stimuli are detected.

18 Claims, 3 Drawing Sheets

GAS LINE SAFETY VALVE SYSTEM

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to a valve system and, more particularly, to a gas line safety valve system for selectively toggling a gas line between operating and non-operating modes.

2. Prior Art

In general, gas appliances have not kept pace with their electrical counterparts in terms of the extended functionality afforded by the use of microprocessor-based control. One reason for this is the lack of an inexpensive and reliable electrically-controllable gas valve that can be incorporated into such devices as clothes dryers, commercial cooking equipment, warm air furnaces and domestic cooking appliances.

In clothes dryers, the ability to modulate the gas flame would add the benefit of shorter drying cycles. With regard to commercial cooking equipment, modulation of the gas flame has the advantage of tighter control of temperature in such appliances as ovens and deep-fat fryers. With regard to warm air furnaces, a controllable gas valve would form the heart of an advanced control system.

Finally, in the area of domestic cooking appliances, such as gas ranges, there is a need for gas flame modulation as well as enhanced functionality of the range. At the present time, residential gas ranges do not take advantage of the convenience, flexibility and safety possible through advanced microprocessor-based technologies.

Accordingly, a need remains for a gas line safety valve system in order to overcome the above noted shortcomings. The present invention satisfies such a need by providing a gas line safety valve system that is versatile and adaptable, while also providing increased safety and protection. Advantageously, such a system can be adapted for use in most structures that are equipped with gas-fired heating systems. The gas line safety valve system is conveniently able to depressurize a gas line system such that no leak is occurring, thereby averting explosions and/or fires.

BRIEF SUMMARY OF THE INVENTION

In view of the foregoing background, it is therefore an object of the present invention to provide a gas line safety valve system. These and other objects, features, and advantages of the invention are provided by a system for selectively toggling a gas line between operating and non-operating modes.

The system includes a control valve operably connected to a gas meter. Such a control valve intersects a gas flow path downstream of the gas meter and upstream of an entry point of a building. The control valve is conveniently adaptable between open and closed positions based upon stimuli received from at least one gas-powered appliance located within the building. Such stimuli are preferably defined by an electric current such that when a user control interface of the appliances is toggled to an on position, an associated one of the sensors will transmit the control signal to the control valve for advantageously allowing gas to flow to at least one of the appliances. A main gas supply line is mated to the control valve and includes a plurality of auxiliary lines branching in parallel to selected ones of the appliances.

The control valve may further include a two-way solenoid operably mated thereto and a bypass line in fluid communication with the two-way solenoid and one of the appliances wherein the two-way solenoid selectively allows a predetermined volume of gas to flow into one of the appliances while the control valve contemporaneously restricts gas flow to remaining ones of the appliances.

A plurality of sensors are operably coupled in series to the appliances and are in communication with the control valve. Such sensors are preferably operably disposed intermediately of the appliances and a plurality of 110-volt power supply sources and are preferably wirelessly connected to the control valve. The sensors may be electrically mated to the control valve.

The present invention further includes a mechanism for transmitting a control signal to the control valve and for eliminating a fully charged gas line when the stimuli are detected by at least one of the sensors such that the control valve can selectively allow and restrict gas flow to the appliances during operating and non-operating modes respectively. Each of the sensors generates a unique control signal when the stimuli are detected.

The system may further include an auxiliary sensor disposed to an exterior of the building and operably connected to the control valve for conveniently detecting alternate stimuli defined by at least one parameter selected from the group including a seismic fluctuation, a pressure fluctuation, a temperature fluctuation, and any combination thereof.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

Figure 1:
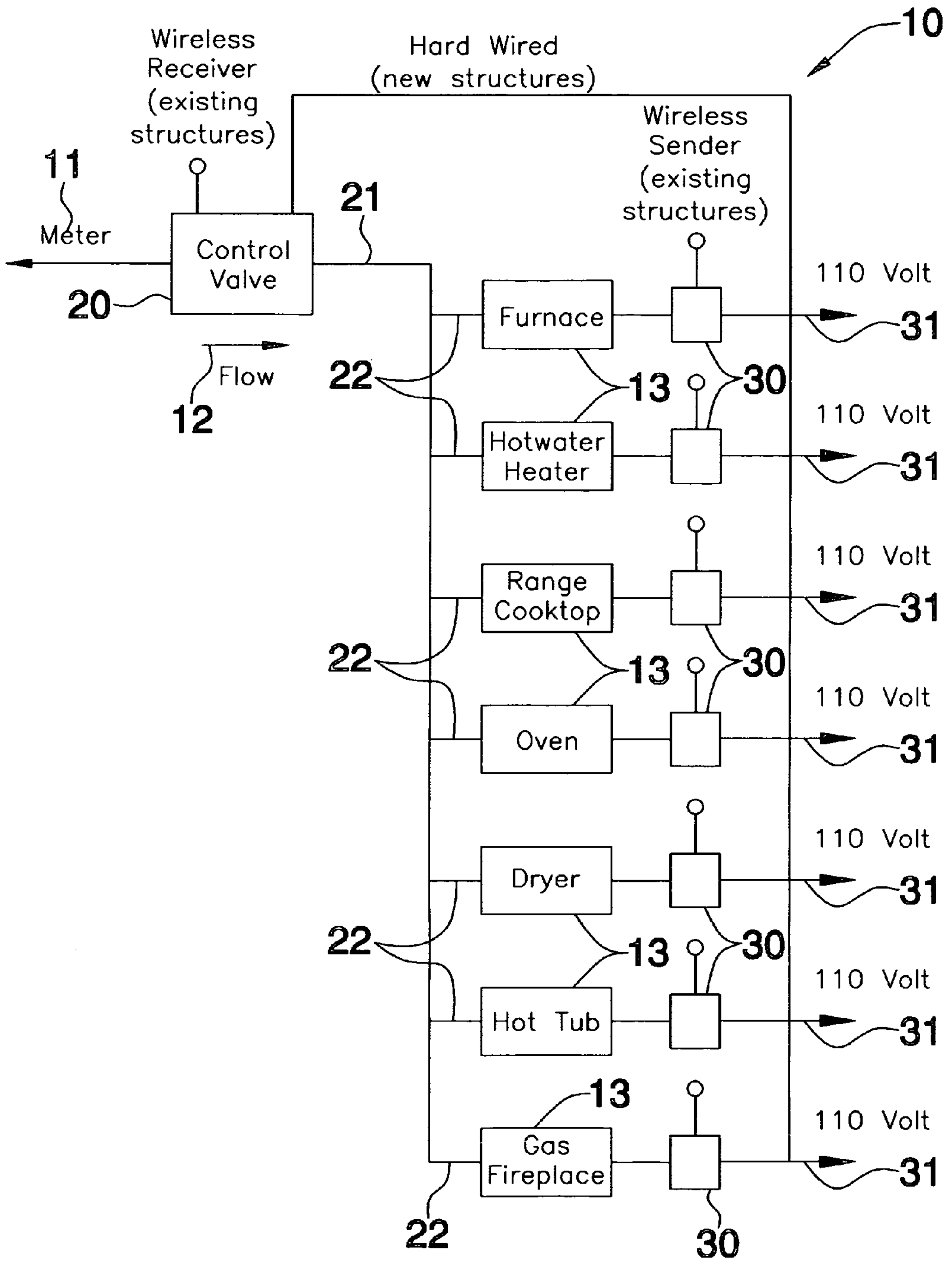
FIG. 1 is a schematic block diagram showing a gas line safety valve system, in accordance with the present invention.
Figure 3:
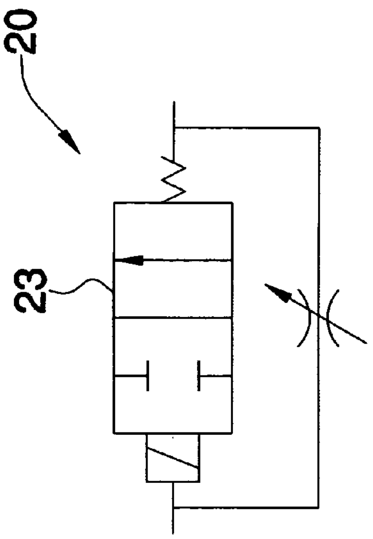
FIG. 3 is a schematic view of the control valve shown in FIG. 2.
Figure 2:
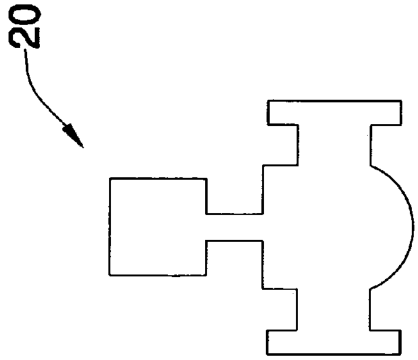
FIG. 2 is front elevational view of the control shown in FIG. 1.

The system of this invention is referred to generally in FIGS. 1–3 by the reference numeral 10 and is intended to provide a gas line safety valve system. It should be understood that the system 10 may be used to protect many different types of gas lines and should not be limited to use in only residential applications.

Referring initially to FIGS. 1 and 2, the system 10 includes a control valve 20 operably connected to a gas meter 11. Such a control valve 20 intersects a gas flow path 12 downstream of the gas meter 11 and upstream of an entry point of a building. The control valve 20 is conveniently adaptable between open and closed positions based upon stimuli received from at least one gas-powered appliance 13 located within the building. Such stimuli are defined by an electric current such that when a user control interface of the appliances 13 is toggled to an on position, an associated one of the sensors 30 (described herein below) will transmit the control signal to the control valve 20 for advantageously allowing gas to flow to at least one of the appliances 13. A main gas supply line 21 is mated to the control valve 20 and includes a plurality of auxiliary lines 22 branching in parallel to selected ones of the appliances 13.

Figure 4:
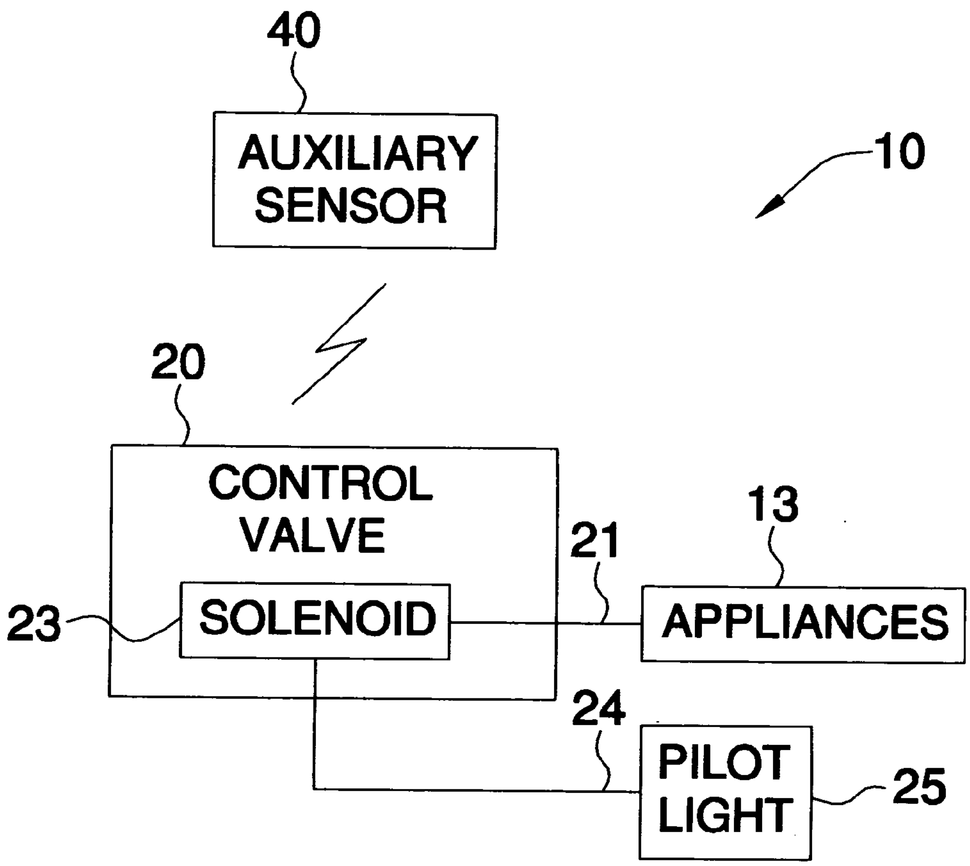
FIG. 4 is a schematic block diagram showing the auxiliary sensor and control valve connection for detecting alternate stimuli.

Referring to FIGS. 3 and 4, the control valve 20 further includes a two-way solenoid 23 operably mated thereto and a bypass line 24 in fluid communication with the two-way solenoid 23 and one of the appliances 13 wherein the two-way solenoid 23 selectively allows a predetermined volume of gas to flow into one of the appliances 13 while the control valve 20 contemporaneously restricts gas flow to remaining ones of the appliances 13. This feature advantageously ensures that appliances 13 that are not being used do not become the source of an unnecessary gas leak, which could lead to a fire or an explosion. The bypass line 24 further connects to a pilot light 25 of the appliances 13 such that the pilot light 25 is maintained even though gas flow is being restricted to the appliance 13.

Referring to FIG. 1, a plurality of sensors 30 are operably coupled in series to the appliances 13 and are in communication with the control valve 20. Such sensors 30 are operably disposed intermediately of the appliances 13 and a plurality of 110-volt power supply sources 31 and are wirelessly connected to the control valve 20. The sensors 30 are further electrically mated to the control valve 20.

Referring to FIG. 3, the present invention further includes a mechanism for transmitting a control signal to the control valve 20 and for advantageously eliminating a fully charged gas line when the stimuli are detected by at least one of the sensors 30 such that the control valve 20 can selectively allow and restrict gas flow to the appliances 13 during operating and non-operating modes respectively. This feature would greatly reduce the risk of fires, since there is less chance of a leak occurring at the appliances 13 not being used, and furthermore saves gas by restricting the free flow thereof. Each of the sensors 30 generates a unique control signal when the stimuli are detected, thus ensuring that the control valve 20 effectively restricts the flow of gas to the correct appliances 13.

Referring to FIG. 4, the system 10 further includes an auxiliary sensor 40 disposed to an exterior of the building and operably connected to the control valve 20 for conveniently detecting alternate stimuli defined by at least one parameter selected from the group including a seismic fluctuation, a pressure fluctuation, a temperature fluctuation, and any combination thereof. Such an auxiliary sensor 40 advantageously alerts the control valve 20 of extreme changes in these parameters which may require the immediate elimination or increase of gas flow to the appliances 13.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A system for selectively toggling a gas line between operating and non-operating modes, said system comprising:

a control valve operably connected to a gas meter, said control valve intersecting a gas flow path downstream of the gas meter and upstream an entry point of a building, said control valve being adaptable between open and closed positions based upon stimuli received from at least one gas-powered appliance located with the building;

a main gas supply line mated to said control valve and including a plurality of auxiliary lines branching to selected ones of the appliances;

a plurality of sensors operably coupled to the appliances and being in communication with said control valve; and means for transmitting a control signal to said control valve and eliminating a fully charged gas line when the stimuli are detected by at least one said sensors such that said control valve can selectively allow and restrict gas flow to the appliances during operating and non-operating modes respectively.

2. The system of claim 1, wherein said sensors are operably disposed intermediately of the appliances and a plurality of 110-volt power supply sources, the stimuli being defined by an electric current such that when a user control interface of the appliances is toggled to an on position an associated one of said sensors will transmit the control signal to said control valve for allowing gas to flow to at least one of the appliances.

3. The system of claim 1, wherein said sensors are wirelessly connected to said control valve.

4. The system of claim 1, wherein said sensors are electrically mated to said control valve.

5. The system of claim 1, further comprising: an auxiliary sensor disposed exterior of the building and operably connected to said control valve for detecting alternate stimuli defined by at least one parameter selected from the group including a seismic fluctuation, a pressure fluctuation, a temperature fluctuation and any combination thereof.

6. The system of claim 1, wherein said control valve further comprises:

a two-way solenoid operably mated thereto; and a bypass line in fluid communication with said two-way solenoid and one of the appliances wherein said two-way solenoid selectively allows a predetermined volume of gas to flow into one of the appliances while said control valve contemporaneously restricts gas flow to remaining ones of the appliances.

7. A system for selectively toggling a gas line between operating and non-operating modes, said system comprising:

a control valve operably connected to a gas meter, said control valve intersecting a gas flow path downstream of the gas meter and upstream an entry point of a building, said control valve being adaptable between open and closed positions based upon stimuli received from at least one gas-powered appliance located with the building;

a main gas supply line mated to said control valve and including a plurality of auxiliary lines branching to selected ones of the appliances;

a plurality of sensors operably coupled in series to the appliances and being in communication with said control valve; and means for transmitting a control signal to said control valve and eliminating a fully charged gas line when the stimuli are detected by at least one said sensors such that said control valve can selectively allow and restrict gas flow to the appliances during operating and non-operating modes respectively.

8. The system of claim 7, wherein said sensors are operably disposed intermediately of the appliances and a plurality of 110-volt power supply sources, the stimuli being defined by an electric current such that when a user control interface of the appliances is toggled to an on position an associated one of said sensors will transmit the control signal to said control valve for allowing gas to flow to at least one of the appliances.

9. The system of claim 7, wherein said sensors are wirelessly connected to said control valve.

10. The system of claim 7, wherein said sensors are electrically mated to said control valve.

11. The system of claim 7, further comprising: an auxiliary sensor disposed exterior of the building and operably connected to said control valve for detecting alternate stimuli defined by at least one parameter selected from the group including a seismic fluctuation, a pressure fluctuation, a temperature fluctuation and any combination thereof.

12. The system of claim 7, wherein said control valve further comprises:

a two-way solenoid operably mated thereto; and a bypass line in fluid communication with said two-way solenoid and one of the appliances wherein said two-way solenoid selectively allows a predetermined volume of gas to flow into one of the appliances while said control valve contemporaneously restricts gas flow to remaining ones of the appliances.

13. A system for selectively toggling a gas line between operating and non-operating modes, said system comprising:

a control valve operably connected to a gas meter, said control valve intersecting a gas flow path downstream of the gas meter and upstream an entry point of a building, said control valve being adaptable between open and closed positions based upon stimuli received from at least one gas-powered appliance located with the building;

a main gas supply line mated to said control valve and including a plurality of auxiliary lines branching in parallel to selected ones of the appliances;

a plurality of sensors operably coupled in series to the appliances and being in communication with said control valve; and means for transmitting a control signal to said control valve and for eliminating a fully charged gas line when the stimuli are detected by at least one said sensors such that said control valve can selectively allow and restrict gas flow to the appliances during operating and non-operating modes respectively, each said sensors generating a unique control signal when the stimuli is detected.

14. The system of claim 13, wherein said sensors are operably disposed intermediately of the appliances and a plurality of 110-volt power supply sources, the stimuli being defined by an electric current such that when a user control interface of the appliances is toggled to an on position an associated one of said sensors will transmit the control signal to said control valve for allowing gas to flow to at least one of the appliances.

15. The system of claim 13, wherein said sensors are wirelessly connected to said control valve.

16. The system of claim 13, wherein said sensors are electrically mated to said control valve.

17. The system of claim 13, further comprising: an auxiliary sensor disposed exterior of the building and operably connected to said control valve for detecting alternate stimuli defined by at least one parameter selected from the group including a seismic fluctuation, a pressure fluctuation, a temperature fluctuation and any combination thereof.

18. The system of claim 13, wherein said control valve further comprises:

a two-way solenoid operably mated thereto; and a bypass line in fluid communication with said two-way solenoid and one of the appliances wherein said two-way solenoid selectively allows a predetermined volume of gas to flow into one of the appliances while said control valve contemporaneously restricts gas flow to remaining ones of the appliances.

* * * * *